United States Patent [19]

Blok

[11] Patent Number: 5,029,609
[45] Date of Patent: Jul. 9, 1991

[54] PRESSURE REDUCING VALVE WITH FLOW FORCES COMPENSATION

[75] Inventor: Petrus Blok, Moerkapelle, Netherlands

[73] Assignee: Koppen & Lethem Beheer B.V., Ijssel, Netherlands

[21] Appl. No.: 585,491

[22] Filed: Sep. 20, 1990

[30] Foreign Application Priority Data

Sep. 21, 1989 [NL] Netherlands .................. 8902364

[51] Int. Cl.⁵ .................................................. G05D 16/02
[52] U.S. Cl. ............................... 137/492.5; 137/505.14
[58] Field of Search ............ 137/492.5, 505.14, 505.18

[56] References Cited

U.S. PATENT DOCUMENTS

| | | | |
|---|---|---|---|
| 2,264,262 | 11/1941 | Erbguth | 137/492.5 |
| 3,389,718 | 6/1968 | Johnson et al. | 137/492.5 |
| 3,495,619 | 2/1970 | Iizumi | 137/492.5 X |
| 3,583,422 | 6/1971 | Dach | 137/505.14 X |
| 4,362,089 | 12/1982 | Melocik et al. | 137/505.18 X |

Primary Examiner—Stephen M. Hepperle
Attorney, Agent, or Firm—Hoffman & Baron

[57] ABSTRACT

The invention relates to a pressure reducing valve essentially consisting of a cylinder a control piston movable in said cylinder, one end of said piston being situated in a control chamber and the other in a spring chamber housing a compression spring biasing the control piston in the opening direction;

an oil supply chamber in the wall of said cylinder, said oil supply chamber having a connection for a supply pressure conduit and together with a control edge provided on the control piston constituting a variable restriction;

an oil discharge conduit disposed downstream of said restriction for the discharge of oil under a reduced pressure;

a load pressure pilot conduit connected to said spring chamber; and a feedback conduit connecting said control chamber to said oil discharge conduit. To compensate for fluid flow forces, the valve is characterized, according to this invention, in that said feedback conduit (11) is provided with a fixed restriction ($R_i$), and the control chamber (10) is connected through a conduit (16) to the spring chamber (13), in which conduit a pressure-dependent restriction (21, 25) is provided, said control piston (6) occupying a stable position if the rate of flow ($Q_i$) through the fixed restriction ($R_i$) equals the rate of flow ($Q_o$) through the pressure-dependent restriction (21, 25).

7 Claims, 5 Drawing Sheets

PRESSURE REDUCING VALVE WITH FLOW FORCES COMPENSATION

This invention relates to a pressure reducing valve essentially consisting of a cylinder, a control piston movable in said cylinder, one end of said piston being situated in a control chamber and the other in a spring chamber housing a compression spring biasing the control piston in the opening direction; an oil supply chamber in the wall of said cylinder, said oil supply chamber having a connection for a supply pressure line, and together with a control edge provided on the control piston constituting a variable restriction; an oil discharge line disposed downstream of said restriction for the discharge of oil under a reduced pressure; a load pressure pilot line connected to said spring chamber; and a feedback line connecting said control chamber to said oil discharge line.

Such pressure reducing valves are often used in hydraulic control systems for adjusting, and maintaining the supply pressure from a pump or source of pressure, subject to large variations, at the correct reduced pressure. It has been found that pressure reducing valves known from practice are not capable of effecting a reduced pressure of constant level independently of variations in the supply pressure. Major deviations are caused by flow forces occurring within the pressure reducing valve, which with increasing supply pressure push the movable control piston of the pressure reducing valve further to its closed position than is necessary to effect a reduced pressure of the desired level.

It is an object of the present invention to overcome this drawback and to provide a pressure reducing valve with which the desired reduced pressure can be kept virtually constant irrespective of substantial variations in supply pressure. The invention is based upon the insight that such oil streams must be supplied to the control piston of the pressure reducing valve that the control piston occupies a stable position, that is to say, that the oil stream to the control chamber is equal to an oil stream from the control chamber when the reduced pressure has reached the desired level, independently of the spurious forces exerted on the control piston. These oil streams to and from the control chamber can be so controlled, independently of the flow effects occurring in the pressure reducing valve that the stable position occupied by the control piston is adapted to the flow effects occurring within the pressure reducing valve. For this purpose the pressure reducing valve according to the invention is characterized in that said feedback line is provided with a fixed restriction, and the control chamber is connected through a conduit to the spring chamber, in which conduit a pressure-dependent restriction is provided, said control piston occupying a stable position if the rate of flow through the fixed restriction equals the rate of flow through the pressuredependent restriction.

Preferably, the pressure-dependent restriction is a vanecontrolled nozzle system, the vane of which is constituted by a membrane forming a partition between, on the one hand, an auxiliary control chamber connected to the control chamber, and on the other hand, a load pressure chamber connected to the spring chamber, in which load pressure chamber the nozzle is arranged.

One embodiment of the pressure reducing valve according to the invention will be described in more detail with reference to the accompanying drawings. In said drawings, FIG. 1 shows an application of a pressure reducing valve in an hydraulic control system for one consumer;

Figure 1:
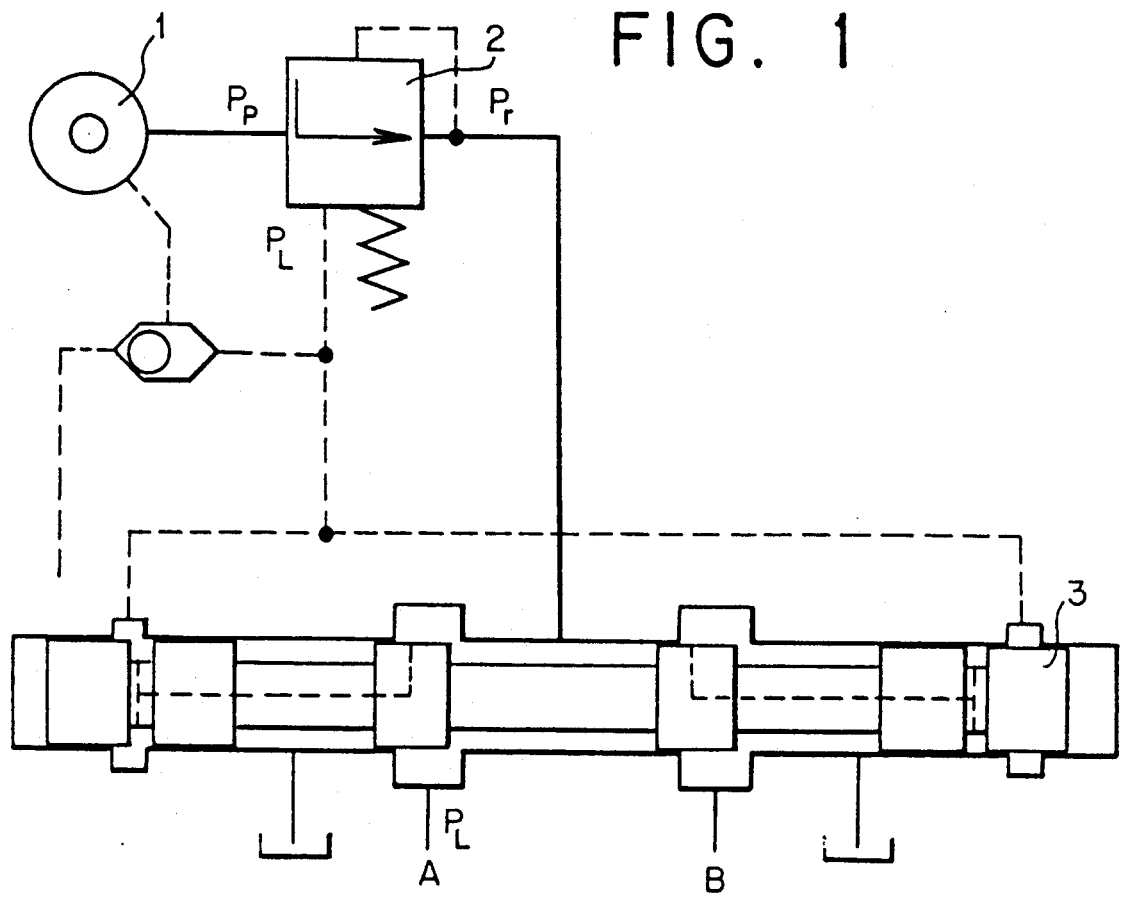

FIG. 1 shows an hydraulic control system for one consumer, for example, a double-acting lifting cylinder (not shown). The control system comprises a pump or pressure source 1 which provides a supply pressure $P_p$, which for example can vary between 0 and 350 bar. The supply pressure $P_p$ is reduced in a pressure reducing valve 2 to $P_r$, and this reduced pressure is supplied to a control valve 3, to which two ports A, B are connected, which through pressure conduits are connected to the double-acting lifting cylinder. In the position shown, port A is open, and port B is connected to the return conduit to an oil reservoir. The counter-pressure to overcome inport A—the load pressure $P_L$—is returned to pressure reducing valve 2 and to pump 1. To effect a controlled operation of the lifting cylinder, it is necessary that the pressure differential $\Delta p = P_r - P_L$ across control valve 3 is constant, so that at a given position of valve 3 a constant quantity of oil flows through the control valve. This pressure differential $\Delta p$ must be independent of variations in the supply pressure $P_p$ and the load pressure $P_L$. The pressure reducing valve 2 has the duty to keep this $\Delta p$ constant.

Figure 2:
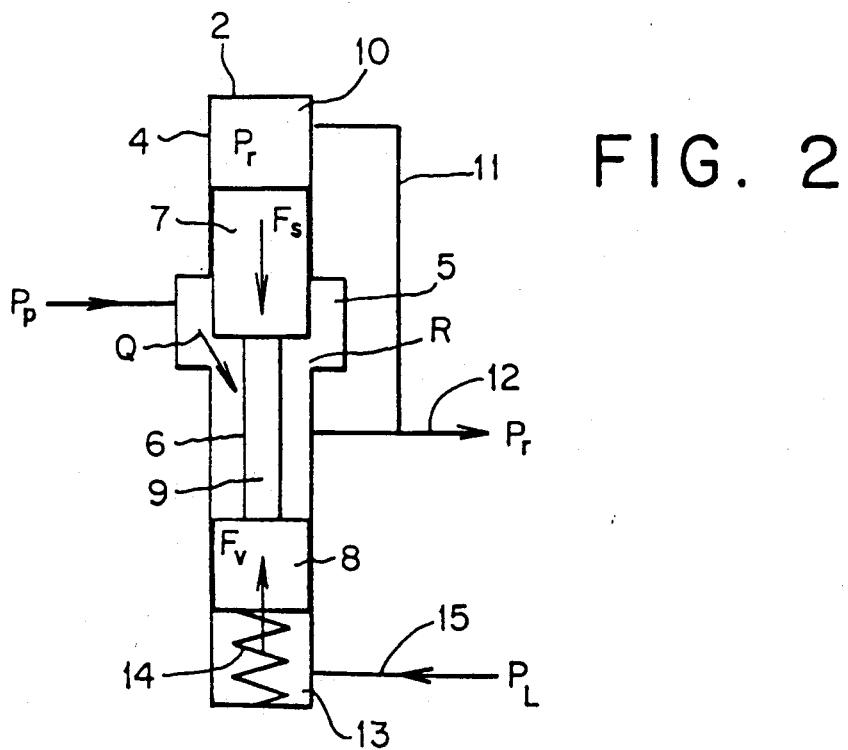
FIG. 2 is a diagrammatic representation of a known, directly-controlled pressure reducing valve.

FIG. 2 is a diagrammatic representation of a conventional directly-controlled pressure reducing valve. Valve 2 consists of a cylinder 4 with an oil supply chamber 5 provided in the wall thereof, to which the supply pressure $P_p$ is connected. Housed in cylinder 4 is a freely-movable control piston 6, consisting of two piston blocks 7, 8 and a connecting portion 9 of smaller diameter. Disposed above piston block 7 is a control chamber 10, which through a feedback conduit 11 is connected to the oil discharge conduit 12 at the reduced pressure $P_r$. Disposed below piston block 8 is a spring chamber 13 with a compression spring 14. Connected further to spring chamber 13 is a pilot conduit 15 for supplying the load pressure $P_L$ to spring chamber 13. The bottom or control edge of piston block 7 cooperates with the rim of the oil supply chamber 5 to form a variable restriction R, through which an oil stream Q flows from the supply pressure connection $P_p$ to the oil discharge conduit 12 at pressure $P_r$.

Control piston 6 is subjected to the following forces or pressures:

In the Δopening direction:
the load pressure $P_L$ the spring force $F_v$
This spring force $F_v$ provides a pressure $P_v = F_v/A$, where A is the surface area of the piston.

In the closing direction:
the pressure $P_r$ in control chamber 10
the flow forces $F_s$, which provide a closing pressure $P_s = F_s/A$.

From the equilibrium of forces on control piston 6, it follows therefore that:

$$P_r = P_L + P_v - P_s.$$

When $P_s = F_s/A$ is absent or neglected (by Selecting A large), the pressure drop Δp across control valve 3 (FIG. 1) is exclusively determined by the spring force $F_v$. When spring force $F_v$ is constant, i.e., the spring is weak, the pressure drop Δp across control valve 3 continues to equal $P_v = F_v/A$. At a load pressure $P_L = 20$ bar and a desired Δp = 7.5 bart, $P_r$ should be and remain = 27.5 bar.

Figure 3:
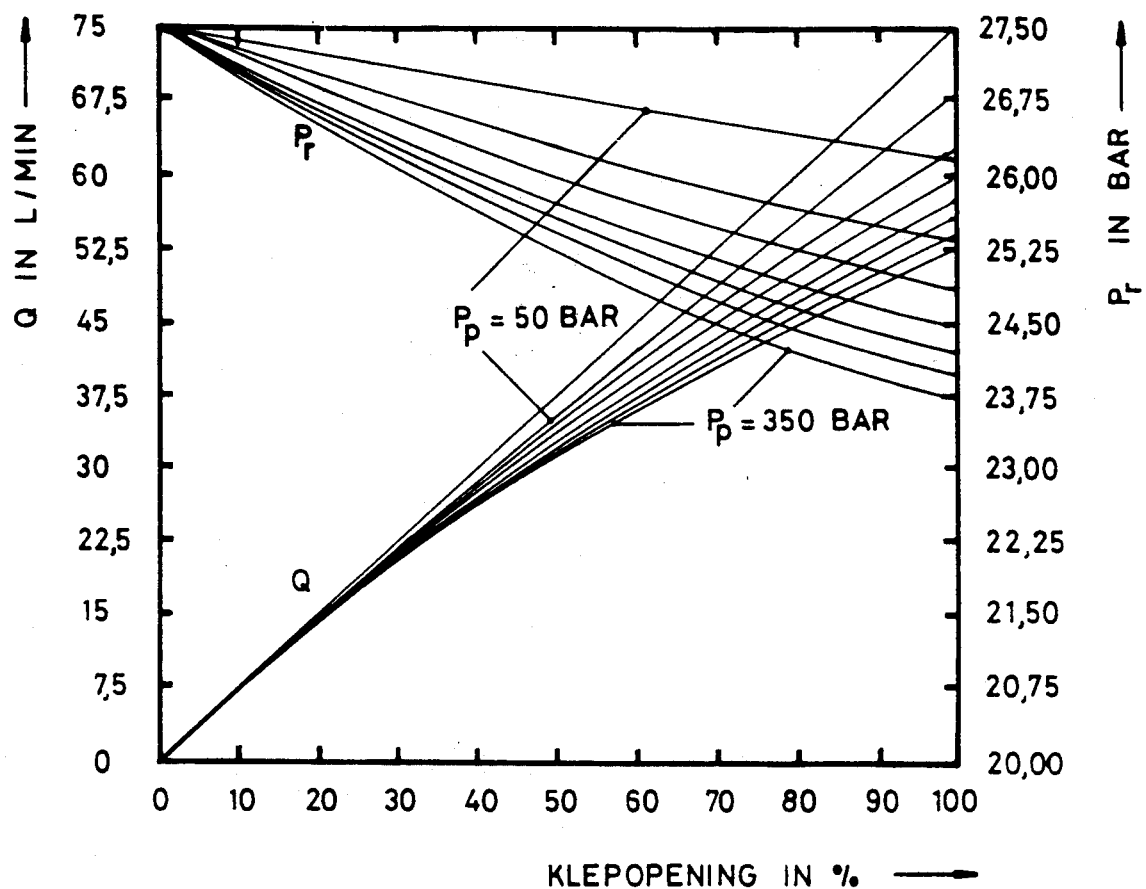
FIG. 3 is a graph indicating the variation in reduced pressure when the supply pressure changes in a valve illustrated in FIG. 2.

FIG. 3 shows the effect which flow forces have on a pressure reducing valve of the type illustrated in FIG. 2 with a maximum throughput of 75 1/min and a control piston diameter of 16 mm, when the supply pressure $P_p$ is varied by increments of 50 bar from 50 to 350 bar at a load pressure $P_L = 20$ bar. The valve opening of a control valve 3 connected downstream of the pressure reducing valve 2 is plotted on the horizontal axis. Plotted on the vertical axis (on the lefthand side) is the oil quantity Q flowing through pressure reducing valve 2, and on the other vertical axis (on the right-hand side) the amount of the reduced pressure $P_r$. In the ideal case, $P_r$ should remain 27.5 bar, and the rate of flow Q should increase in direct proportion to an increased valve opening.

FIG. 3 shows, however, that the reduced pressure $P_r$ decreases with an increasing supply pressure $P_p$ In addition, this decrease becomes greater with an increasing valve opening. In the most unfavourable case—maximum valve opening and maximum supply pressure $P_p$—the reduced pressure is decreased from 27.5 to 23.75 bar. As the throughflow through control valve 3 (FIG. 1) varies with the square root of the pressure drop Δp, the rate of flow Q flowing through control valve 3 and hence also through the pressure reducing valve 2 will decrease by 30%. A sudden decrease in supply pressure $P_p$, for example, as a result of the highest load pressure in a multi-consumer hydraulic system dropping out, will greatly increase, both the reduced pressure $P_r$ and the rate of flow Q through the control valve of a consumer with a low load pressure $P_L$, and this may lead to dangerous situations.

A possible solution for this problem could be the provision of a pre-control valve on the pressure reducing valve 2, to operate the control piston 6 of the pressure reducing valve 2. The comparison of $P_r$ with $P_L + P_v$ then takes place on the pre-control valve, and no longer on control piston 6, where the result is affected by the flow forces. It is an extremely difficult, and in addition expensive solution to render the pre-control valve insensitive to the flow forces acting on control piston 6. In principle, such a pre-control valve only serves to generate an oil stream by means of which the control piston 6 of the reducing valve 2 can be displaced to compensate for deviations in the pressure $P_r$. In the following, it will be considered how such correction streams could be generated by means of fixed restrictions.

Figure 4:
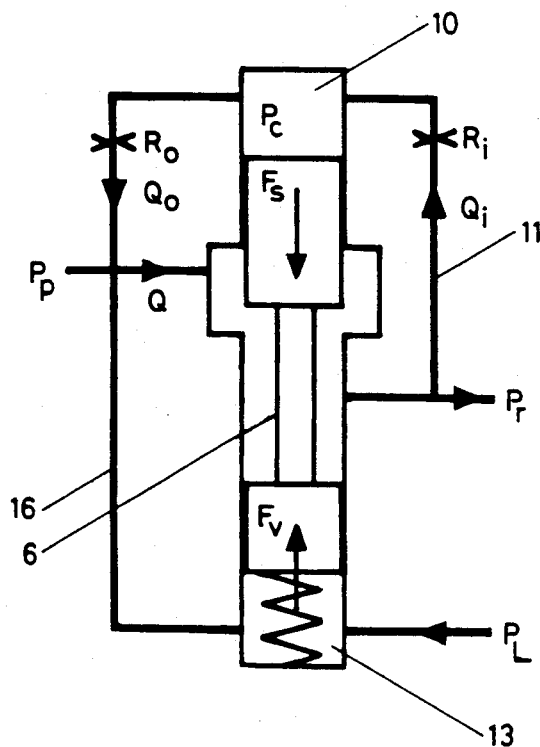
FIG. 4 is a pressure reducing valve pre-controlled with fixed restrictions.

In FIG. 4, a fixed restriction $R_i$ is provided in the feedback conduit 11 in the pressure reducing valve shown in FIG. 2. The control chamber 10 is connected to the spring chamber 13 through a conduit 16 which incorporates a fixed restriction $R_o$. The restrictions $R_i$ and $R_o$ are equal and have been so selected that with a maximum occurring pressure drop $\Delta p = F_v/A$ across such restrictions, acceptable values are obtained for the rates of throughflow $Q_i$ and $Q_o$ with a view to the reaction velocity of the pressure reducing valve and the losses thereby caused.

Within control chamber 10, a control pressure $P_c = P_L + P_v - P_s$ prevails. The rate of throughflow $Q_i$ is determined by the pressure drop $P_r - P_o$ across the restriction $R_i$, and $Q_o$ by the pressure drop $P_c - P_L = P_v - P_s$ across $R_o$.

Figure 5:
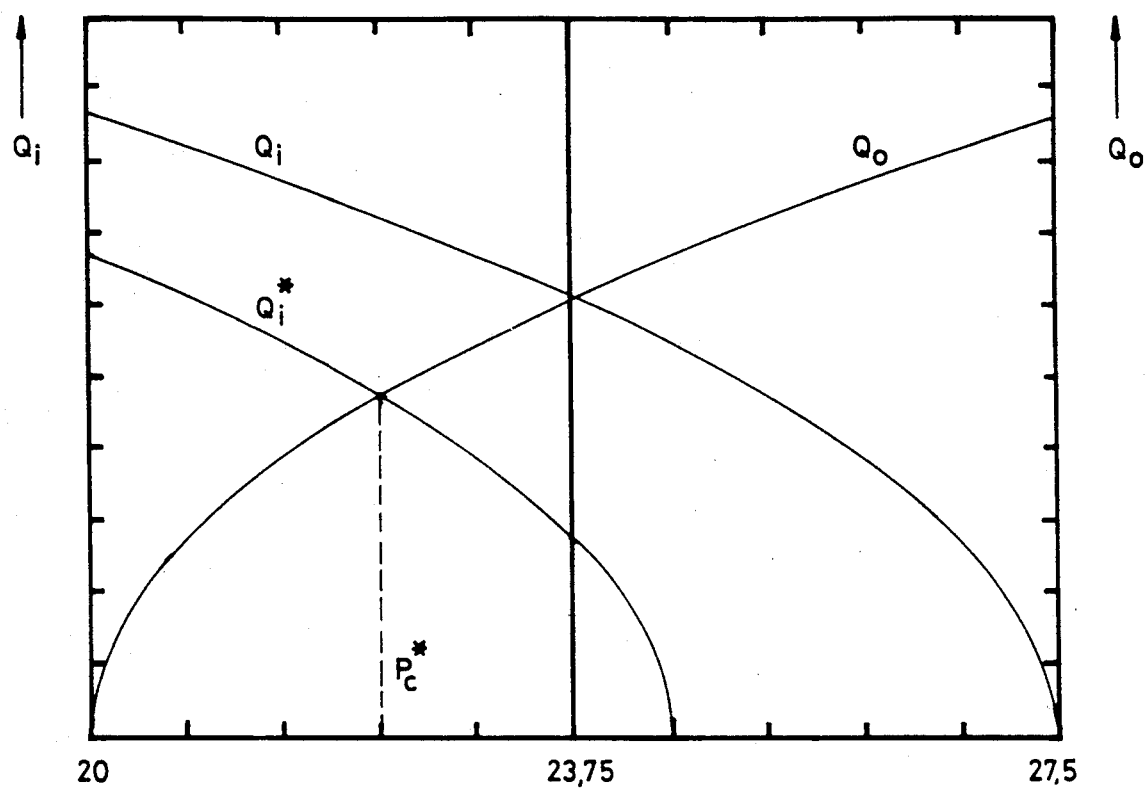
FIG. 5 shows the variation of the control streams as a function of the pressure in the control chamber in a valve illustrated in FIG. 4.

The control piston 6 is stationary, if $Q_i = Q_o$, so that, as $R_i = R_o$, in that case the pressure drop across $R_i$ must be equal to the pressure drop across $R_o$, i.e. $P_r - P_c = P_v - P_s$. With $P_c = P_L + P_v - P_s$, it follows that the reduced pressure $P_r = P_L + 2P_v - 2P_s$. The variation of $Q_i$ and $Q_o$ in dependence upon $P_c$ and with a constant $P_r$ of 27.5 bar (this is the desired value of $P_r$ when $P_L = 20$ bar) are shown in FIG. 5. It will be seen that in this case a stable position of equilibrium of the control piston 6 occurs when $P_c = 23.75$ bar. Accordingly, when the flow forces are neglected, the spring pressure should be so dimensioned in this case that $P_v = 3.75$ bar. When, under the inclluence of flow forces, $P_c$ is decreased to $P_c^*$, $Q_o$ will become lower and $Q_i$ initially higher. As a consequence, the oil volume of control chamber 10 will be increased, so that the control piston is going to close, and the resistance of $P_p$ to $P_r$ rises and $P_r$ is going to decrease. As a consequence, $Q_i$ also decreases, and another position of equilibrium is established, in which $Q_i^*$ equals the value of $Q_o$ associated with $P_c^*$. But $P_r$ is now accordingly lower than desirable.

As compared with the valve illustrated in FIG. 2, therefore, $P_v$ has been reduced from 7.5 to 3.75 bar, and the effect of the flow forces $F_s$ is twice as large.

A solution for the undesirable dependence of $P_r$ on $P_o$ which varies under the influence of various loads, can be found by making the restriction $R_o$ so pressure-sensitive that the throughflow characteristics for $Q_i$ and $Q_o$ in FIG. 5 coincide. Then with $P_r = 27.5$ bar $Q_i$ will always be $= Q_o$, i.e. in particular independently of $P_o$, and the control piston 6 will remain stationary at that value of $P_r$. This is best achieved in practice in a range in which $P_c$ varies from 27.5-bar (with $P_L = 20$ bar). To this effect, the spring pressure is increased to $P_v = 7.5$ bar so that, without flow forces, $P_c = 27.5$ bar and hence $Q_i$ is zero, because the pressure drop across $R_i$ is now zero. Under the influence of the flow forces, $P_c$ can now drop to about 22.5 bar with a slight effect on $P_r$. Accordingly, the valve should be so dimensioned that $P_s$ is no more than 5 bar. In the numerical example given hereinbefore, this is satisfied with a control piston diameter of 16 mm with a supply pressure of 350 bar, a load pressure of 20 bar and a maximum throughput of 75 1/min. $P_s$ is then about 3.75 bar.

Figure 6A:
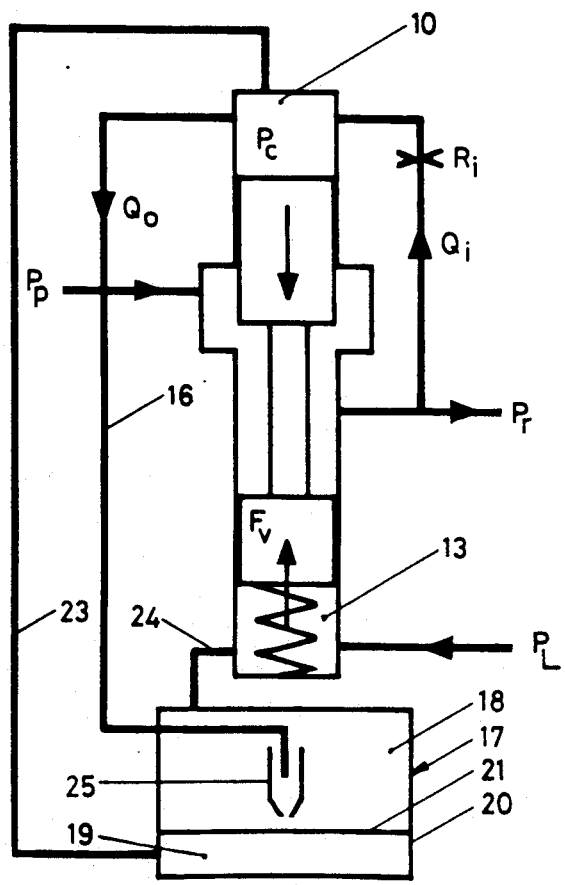
FIG. 6A is a diagrammatic representation of a pressure reducing valve according to the present invention.
Figure 6B:
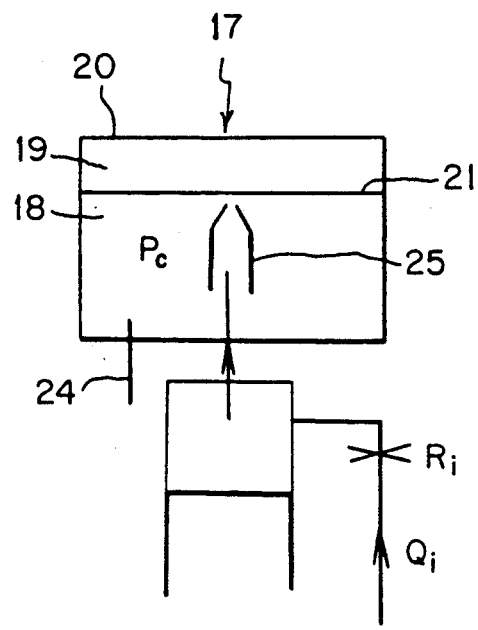
FIG. 6B shows a variant of the pressure reducing valve illustrated in FIG. 6A.

A restriction $R_o$ with the above-defined characteristics is shown in FIG. 6A and comprises a vane-controlled nozzle system 17. System 17 is housed in a reservoir 20 consisting of two chambers 18, 19 separated from each other by a membrane 21. The bottom or auxiliary control chamber 19 is connected through a conduit 23 to the control chamber 10, so that the control pressure $P_o$ prevails in chamber 19. The top or load pressure chamber 18 is through conduit 16 also connected to control chamber 10, and through conduit 24 to the spring chamber 13. Connected to the end of conduit 16 within chamber 18 is a nozzle 25. The vane-controlled nozzle system 17 can alternatively be provided adjacent to control chamber 10, where the connection 23 between control chamber 10 and auxiliary control chamber 19 is constituted by a hole with a small diameter in the centre of membrane 21 in opposition to nozzle 25 (see FIG. 6B).

Membrane 21 is arranged so that nozzle 25 is closed if the pressure differential across the membrane 21 $P_c - P_L$ equals 7.5 bar, i.e., equals the spring pressure $F_v/A$. If $P_c - P_L$ equals or exceeds 7.5 bar, the reducing valve illustrated in FIG. 6 will operate in the same way as that shown in FIG. 2, with $P_r = P_c$ and $P_c = P_L + P_v$ and $Q_i = Q_o = 0$. If $P_c - P_L$ is decreased below the desired pressure drop of 7.5 bar, then owing to the decrease of $P_c$ membrane 21 will be released from nozzle 25 and an oil stream $Q_o$ will begin to flow from control chamber 10, through nozzle 25 to chamber 18 above membrane 21 and further to spring chamber 13. In addition, an oil current $Q_i$ will begin to flow through $R_i$, because $P_c$ has decreased below the value of $P_r = 27.5$ bar. As the throughflow characteristics for $Q_i$ and $Q_o$ have now been made equal, however, $Q_i$ will still be $= Q_o$, also when $P_c$ is decreased. Accordingly, the control piston remains stationary, and $P_r$ retains the desired value of 27.5 bar.

Figure 7:
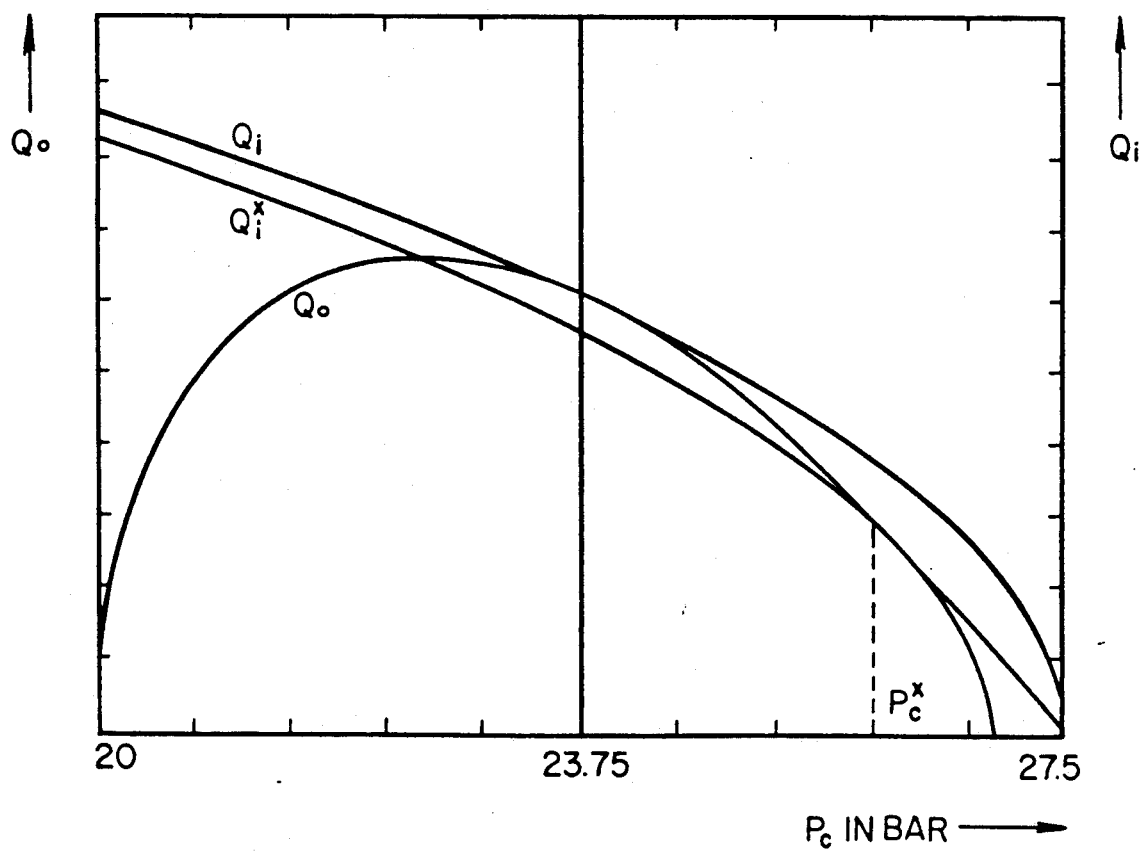
FIG. 7 shows the variation of the control streams in a valve according to FIG. 6.
Figure 8:
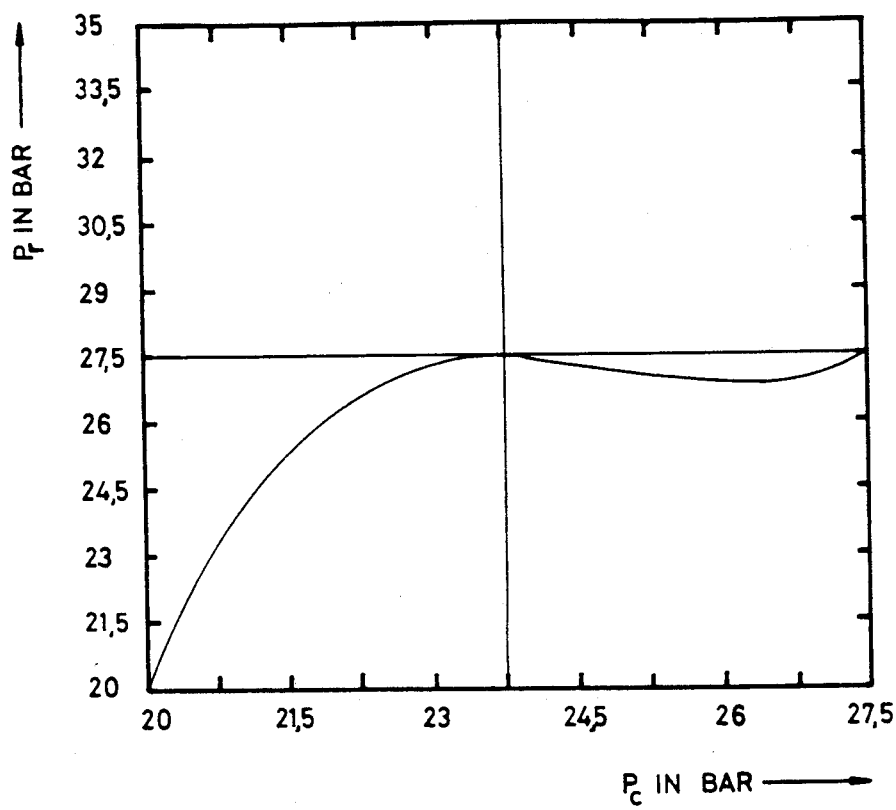
FIG. 8 shows the variation of the controlled pressure $P_r$ as a function of the pressure in the control chamber.

The variation of $Q_i$ and $Q_o$ in the valve illustrated in FIG. 6 is shown in FIG. 7 in dependence upon $P_c$, with $P_L = 20$ bar and $P_r = 27.5$ bar. In the range between 22.5 and 27.5 bar, the deviation between $Q_i$ and $Q_o$ is very slight, so that the correction of $P_r$ to provide for $Q_i = Q_o$ will also be slight. This is shown even better in FIG. 8, in which $P_r$ is shown as a function of $P_c$. It will be seen that in the range between 22.5 and 27.5 bar $P_r$ is virtually independent of $P_c$. An increase in the flow forces to about $P_2 = 5$ bar can be absorbed virtually without any variation of $P_r$.

Figure 9:
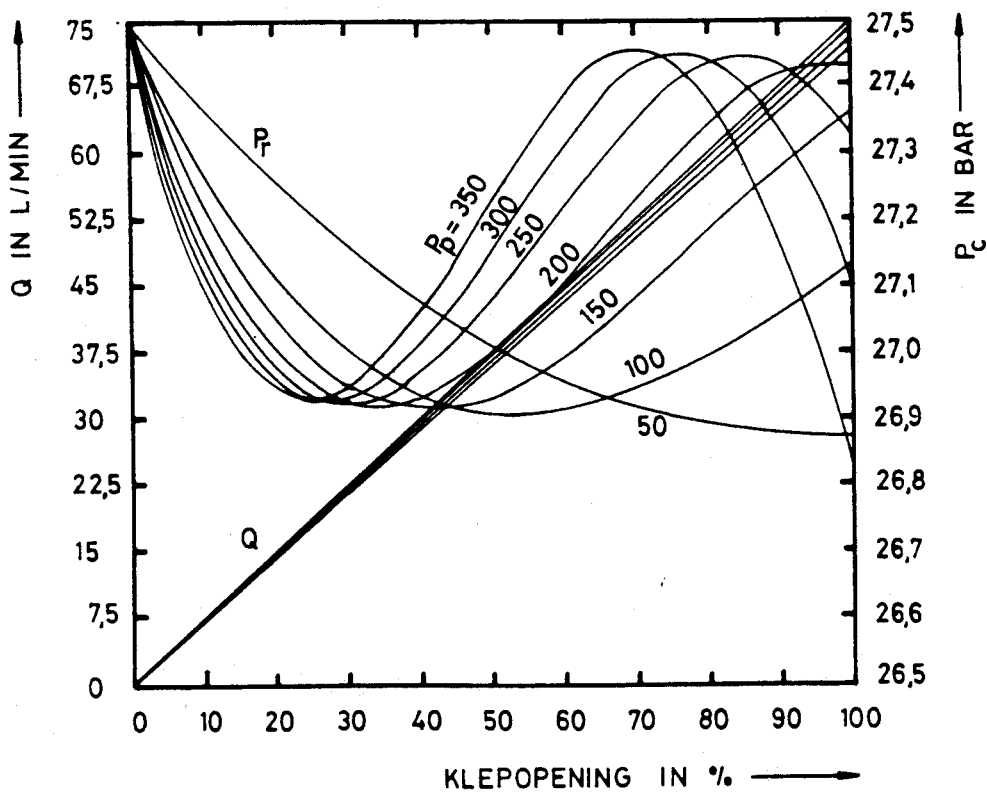
FIG. 9 shows the rate of flow Q of the control system illustrated in FIG. 1 when a pressure reducing valve shown in FIG. 6 is used with variable supply pressure.

FIG. 9 illustrates the effect of the flow forces on $P_r$ and Q similarly to FIG. 3, with the only difference that, on the right-hand vertical axis of FIG. 9 $P_r$ varies from 26.5 to 27.5 bar. An increase or decrease of the supply pressure $P_p$ only has a slight effect on the value of $P_r$. The oil stream Q, too, remains virtually directly proportional to the amount of the valve opening.

I claim:

1. In a pressure reducing valve essentially consisting of
   a cylinder
   a control piston movable in said cylinder, one end of said piston being situated in a control chamber and the other in a spring chamber housing a compression spring biasing the control piston in the opening direction;
   an oil supply chamber in the wall of said cylinder, said oil supply chamber having a connection for a supply pressure conduit and together with a control edge provided on the control piston constituting a variable restriction;
   an oil discharge conduit disposed downstream of said restriction for the discharge of oil under a reduced pressure;
   a load pressure pilot conduit connected to said spring chamber; and
   a feedback conduit connecting said control chamber to said oil discharge conduit,
   the improvement which comprises that said feedback conduit (11) is provided with a fixed restriction ($R_i$), and the control chamber (10) is connected through a conduit (16) to the spring chamber (13), in which conduit a pressure-dependent restriction (21, 25) is provided, said control piston (6) occupying a stable position if the rate of flow ($Q_i$) through the fixed restriction ($R_i$) equals the rate of flow ($Q_o$) through the pressure-dependent restriction (21, 25).

2. A pressure reducing valve as claimed in claim 1, wherein the rate of flow ($Q_o$) through the pressure-dependent restriction ($R_o$; 21, 25) as a result of the pressure differential ($P_c - P_L$) is equal to, or virtually equal to, the rate of flow ($Q_i$) through a fixed restriction ($R_i$) as a result of a pressure differential ($P_r - P_c$), which restriction ($R_i$) is provided in series with the pressure-dependent restriction ($R_o$; 21, 25), upon the occurrence of variations of the control pressure ($P_c$) and a fixed value of the pressure differential ($P_r - P_L$).

3. A pressure reducing valve as claimed in claim 1, wherein the pressure-dependent restriction (21, 25) is closed if the pressure ($P_c$) within the control chamber (10) of the pressure reducing valve equals or exceeds the sum of the spring pressure ($F_v/A$) provided by the spring (14) within the spring chamber (13) and the load pressure ($P_L$).

4. A pressure reducing valve as claimed in claim 1, wherein the pressure-dependent restriction (21, 25) is a vane controlled nozzle system (17), the vane of which is constituted by a membrane (21) forming a partition between, on the one hand, an auxiliary control chamber (19) connected by means of a conduit (23) to the control chamber (10), and on the other hand, a load pressure chamber (18) connected to the spring chamber (13), in which load pressure chamber (18) said nozzle (25) is provided.

5. A pressure reducing valve as claimed in claim 4, wherein the connecting conduit (23) between said auxiliary control chamber (19) and said control chamber (10) is constituted by a hole of small diameter, provided in the centre of said membrane (21) in opposition to said nozzle (25).

6. A pressure reducing valve as claimed in claim 4, wherein said membrane (21) is dimensioned so that the rate of flow ($Q_c$) through said nozzle (25) initially increases upon a decrease of the pressure differential ($P_c - P_L$) across the membrane (21).

7. A pressure reducing valve as claimed in claim 6, characterized in that the maximum rate of flow ($Q_o$) through said nozzle (25) is reached when the pressure differential between the reduced pressure ($P_r$) and the control pressure ($P_c$) in said control chamber (10) is equal to the pressure ($F_s/A$) exerted in the closing direction on the control piston (6) by the flow forces with a maximum supply pressure ($P_p$) and a maximum throughput volume (Q).

* * * * *